INVENTOR.
ALBERT MACOVSKI
BY Samuel Lindenberg
Abraham Wasserman
ATTORNEYS

INVENTOR.
ALBERT MACOVSKI
BY Samuel Lindenberg
Abraham Wasserman
ATTORNEYS

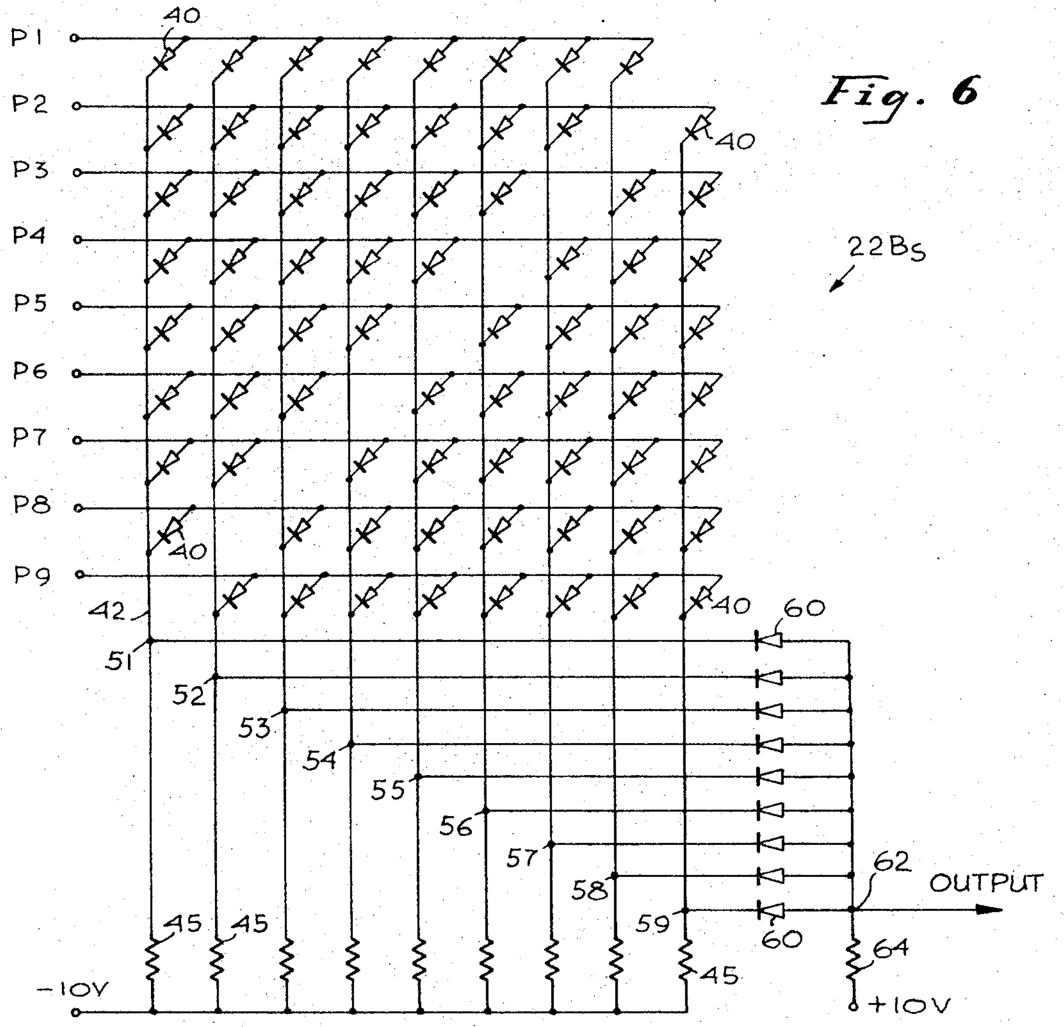
Fig. 6
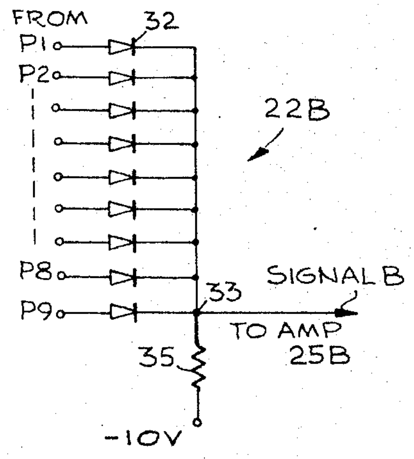
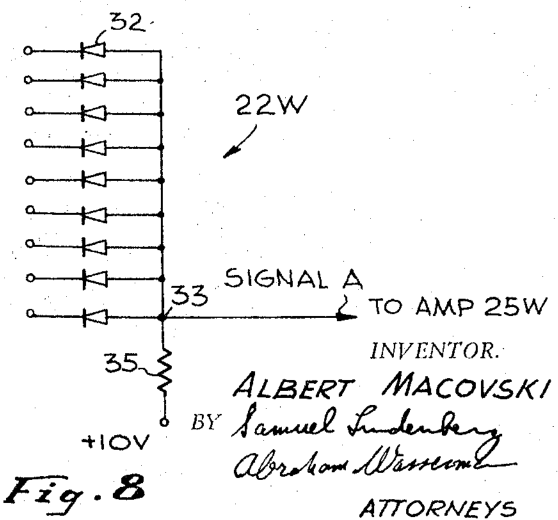
Fig. 7 Fig. 8
INVENTOR.
ALBERT MACOVSKI
BY Samuel Lindenberg
Abraham Wasserman
ATTORNEYS INVENTOR.
ALBERT MACOVSKI
BY Samuel Lindenberg
Abraham Wasserman
ATTORNEYS INVENTOR.
ALBERT MACOVSKI
BY Samuel Lindenberg
Abraham Wasserman
ATTORNEYS United States Patent Office 3,462,547

Patented Aug. 19, 1969

3,462,547

DATA PROCESSING SYSTEM FOR SIGNALS OBTAINED FROM A VIDEO SCANNER

Albert Macovski, Palo Alto, Calif., assignor to Stanford Research Institute, Menlo Park, Calif., a corporation of California Filed Sept. 6, 1966, Ser. No. 577,312
Int. Cl. H04n 3/12
U.S. Cl. 178—7.1 15 Claims The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates to a data processing system and, more particularly, to improvements in a system for processing signals, produced by scanning a picture.

Various techniques have been developed to transmit a picture by processing its photographic properties into related signals, which are then transmitted to any desired location. Generally, the processing is accomplished by employing photoelectric devices, such as photocells, which provide signals or information bits, related to the average brightness or intensity of scanned instruments, or elements of the picture to be transmitted. The number of information bits, representative of each picture, is related to the number of elements into which the picture is divided. To reduce the number of information bits, the picture may be divided into fewer, larger-size picture elements, so that each information bit represents the average intensity of a larger-size element.

The increased size of each picture element results in two general types of picture deterioration. Firstly, any repetitive information greater than the picture element rate is not detected. Secondly, detail contrast of small isolated features, such as lines or dots in the picture element is greatly reduced, since such features may occupy only a small portion of the larger picture element and therefore, they do not appreciably affect the output signal or information bit, which represents the average intensity of the entire picture element.

Since, in some applications, such as for example, in the analysis of meteorological pictures, detail contrast of small isolated features may be most significant, merely increasing the size of the picture element, represented by each signal in order to reduce the number of information bits needed to transmit the picture, has been found to be quite unsatisfactory. Yet, a need exists for a system capable of processing a picture into a minimum number of information bits which may be used to produce an acceptable reproduction of the original picture. To reduce the number of information bits, which can be thought of as compressing the system's bandwidth, is important in situations where limited bandwidth communication channels are available. Also, by compressing the system's bandwidth, the time and cost of transmitting each picture is reduced which may be most signficant where large numbers of pictures are continuously transmitted over long line communication links which are complex and costly facilities.

Therefore, it is a primary object of the present invention to provide a new system for processing picture details into related signals.

Another object is to provide a relatively simple picture processing system of compressed bandwidth.

Yet another object is the provision of a system for processing a picture into a smaller number of information bits than that required by prior art systems, to reproduce the picture with comparable resolution.

A further object is to provide a processing system wherein relatively large picture elements are processed to produce information bits from which the original picture may be reproduced without significant detail deterioration.

These and other objects of the invention are achieved by providing a system in which each of a plurality of relatively large picture elements, into which a picture is divided, is scanned, energizing a matrix of photoelectric elements or photocells which provide a plurality of output signals. The output signal of each photocell represents the average brightness or intensity of a different portion of the relatively large picture element. The photocells' output signals are processed in any one of a plurality of possible combinations to provide a single output signal or information bit, which is a function of the intensity characteristics of the large picture element. When these information bits are used to reproduce the original picture, the finally reproduced picture contains significant detail contrast of small features which are generally absent in pictures reproduced by prior art systems with an equal number of information bits.

The novel features that are considered characteristic of this invention are set forth with particularity in the appended claims. The invention will best be understood from the following description when read in connection with the accompanying drawings, in which:

FIGURE 6 is a schematic diagram of a selection gate for selecting the second blackest signal out of a plurality of nine signals;

FIGURE 7 is a schematic diagram of an analog selection gate shown in FIGURE 3;

FIGURE 8 is a schematic diagram of an analog selection gate shown in FIGURE 4;

Figures 1, 2:
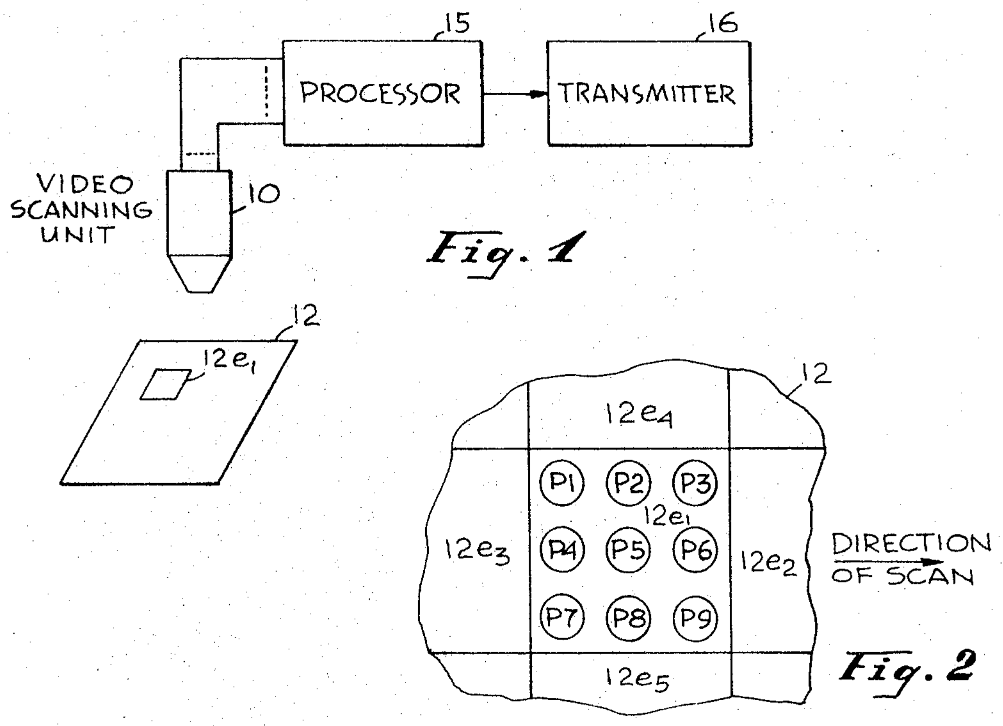
FIGURE 1 is a simple block diagram of a video signal processing system.
FIGURE 2 is a top view of a picture 12 comprising a plurality of relatively large picture elements with a multicell matrix disposed above one of the elements.

Attention is now directed to FIGURE 1 which is a simplified block diagram of the processing system of the present invention. Therein, a video scanning unit 10 is shown scanning a picture 12, assumed to be divisable into a plurality of relatively large picture elements, one of which is designated 12$e_1$. In the prior art, the picture is generally divided into a relatively large number of small elements so that the scanner, used to scan the picture, provides a signal representing the average intensity of each of the small elements into which the picture is divided taken in sequence. Consequently, the number of information bits necessary to represent a single picture is quite large.

However, in accordance with the teachings of the present invention, the picture 12 is divided into fewer, relatively large size picture elements, with the scanning unit 10 providing, in response to scanning each one of the larger size elements, a plurality of signals from a multicell scanner included in unit 10. These are transmitted to a processor 15. Therein, the signals derived in response to scanning each element are combined in a manner to be described hereafter in detail, to produce a single signal or information bit. This information bit is then supplied to a transmitter 16, which transmits the information bit to any desired location where the original picture 12 is to be reproduced or stored for future reproduction. By increasing the size of each picture element, and yet providing a single information bit in response to the scanning thereof, the number of information bits necessary to reproduce a single picture is reduced and thereby substantial compression of bandwidth is attained.

In one embodiment of the present invention, in conjunction with which the invention will hereafter be described, the video scanning unit 10 includes a 3 x 3 array of photocells, designated in FIGURE 2, to which reference is made herein, by P1 through P9 respectively. When each of the picture elements is scanned, each photocell supplies an output signal, also referred to simply as a signal, to processor 15. It is appreciated that the signal from each cell represents the average intensity in the portion of the picture element to which the particular photocell responds. Thus, the relatively larger size picture element may be thought of as being divided into nine element portions, with each of the photocells providing a signal representing the average intensity in one of the element portions.

However, instead of transmitting the nine signals, supplied by the nine photocells in the 3 x 3 array, the signals are first processed in processor 15. Therein, they are combined to result in a single signal or information bit which, when used to reproduce the scanned picture element, provides superior results than those which could be attained by simply averaging the signals from the nine photocells. Briefly, a nonlinear processing technique is employed in processor 15 in order to preserve the intensity characteristics of the scanned element. This is accomplished by processing the signals supplied from unit 10 to detect one or more peak signals representing peak intensities produced by fine lines in the picture element, as well as produce a signal representing the average intensity of the scanned element. The signals representing the peak intensities, as well as the average element intensity, are then combined to produce a single information bit, supplied to transmitter 16. In FIGURE 2, the photocell array is shown above picture element 12$e_1$ of picture 12. Element 12$e_1$ is shown surrounded by neighboring elements, designated 12$e_2$–12$e_6$.

Figure 3:
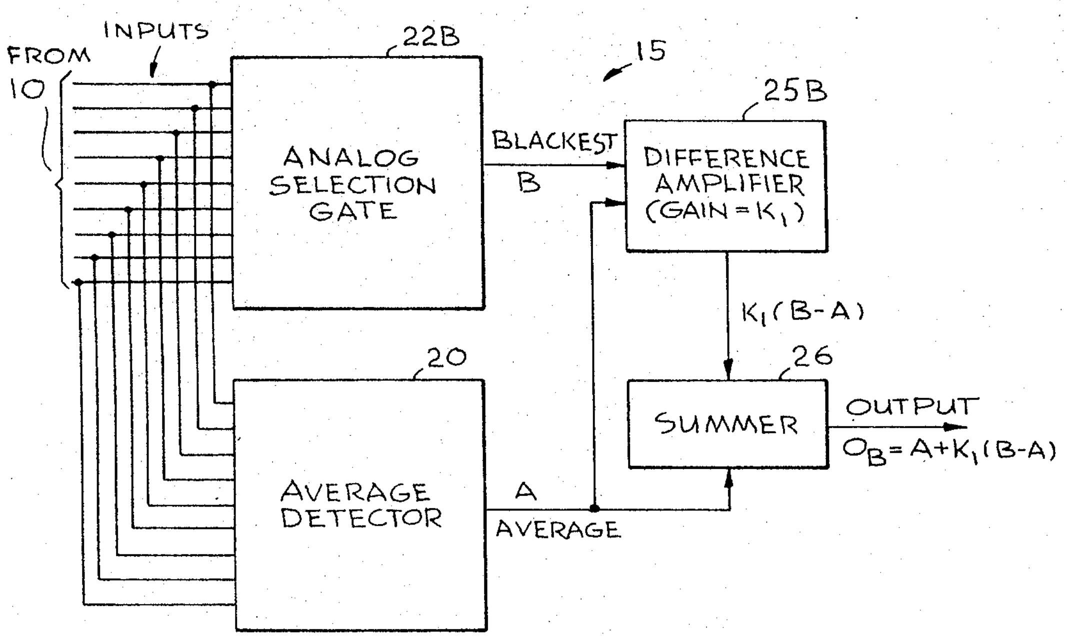
FIGURE 3 is an embodiment of a video signal processor.

Reference is now made to FIGURE 3 which is a block diagram of one embodiment of processor 15. Therein, nine signals from unit 10, represeting the outputs of photocells P1 through P9, are shown supplied to an average detector 20 and an analog selection gate 22B. As appreciated by those familiar with the art, the output of each photocell may be an analog signal such as a voltage, which is related to the picture intensity sensed by the cell. For explanatory purposes, the sensing of a black element portion is assumed to result in a positive voltage, while a white element portion provides a negative voltage. Detector 20 combines the nine signals, supplied thereto, to provide an average signal A which represents the average voltage of the nine signals from the nine photocells. Thus average signal A represents the average intensity of all the nine portions of the scanned element, such as 12$e_1$.

On the other hand, the analog selection gate 22B serves as an analog selector, providing an output signal which is the peak or largest positive signal of the nine signals supplied thereto. The letter B following numeral 22 indicates that it operates to provide an output signal representing the element portion in picture element 12$e_1$ which has the blackest average intensity. That is, gate 22B is operated to provide an output signal with the maximum positive voltage of the nine signals, supplied from scanning unit 10. In FIGURE 3, the output signal of gate 22B, representing the blackest average intensity in any of the nine portions of picture element 12$e_1$ is designated by the letter B. Hereafter, it will also be referred to as the blackest signal or the peak black signal.

The average signal A and the peak signal B are supplied to a difference amplifier 25B, the output of which is a signal represented by $K_1(B-A)$, where $K_1$ is the amplifier's gain, which is assumed to be adjustable. The output fo difference amplifier 25B, as well as the average signal A from detector 20, are supplied to a summing circuit or summer 26. The output signal of summer 26 is designated $O_B$, representing the sum of the signals supplied thereto. Signal $O_B$ may be expressed as $$O_B=A+K_1(B-A)$$

The subscript B indicates that O is related to or a function of the blackest sigal B. Also, the B following the numerical designation of amplifier 25B indicates that the amplifier provides the difference between the blackest signal B and the average signal A.

A gate 22W, similar to gate 22B, may be operated to provide a whitest signal W, which is the same as the signal from the photocells with the largest negative voltage, representing the whitest average intensity of any of the element portions. It can also be thought of as representing the whitest element portion.

Figure 4:
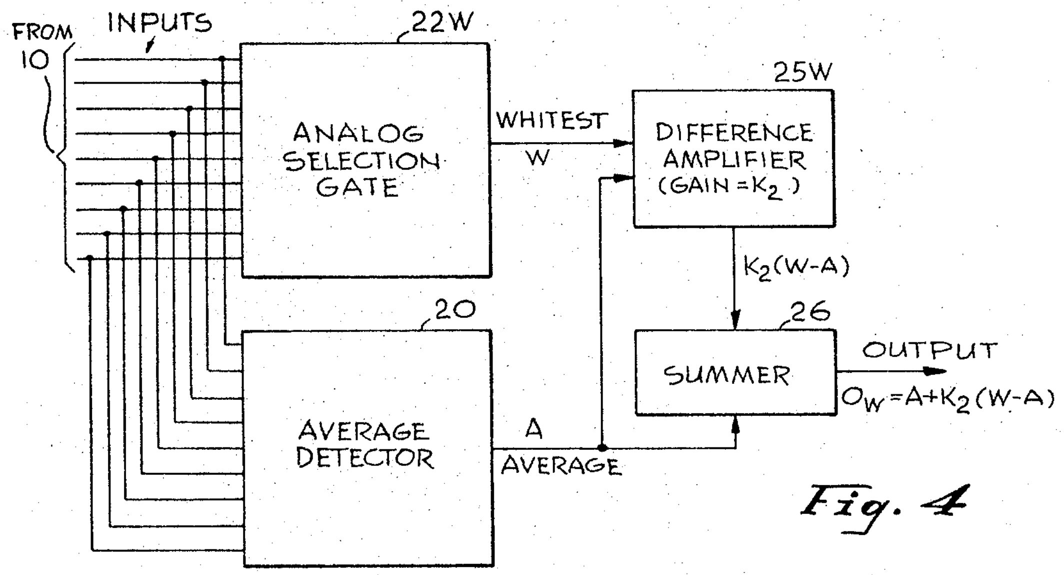
FIGURE 4 is another embodiment of a video signal processor.

A gate 22W is diagrammed in FIGURE 4. In such a case, the output signal W is supplied to a difference amplifier 25W (FIGURE 4), the output of which may be represented by $K_2(W-A)$. The output of summer 26 is designated by $$O_W=A+K_2(W-A)$$

The subscript W indicates that the output signal O is related to the whitest signal W.

From the foregoing, it is thus seen that in accordance with the teachings of the present invention, a relatively large picture element, such as 12$e_1$ (FIGURE 2), may be scanned to produce a plurality of analog signals, each related to the average intensity in a different element portion. These signals are then processed to produce a single output signal O. By properly selecting the gain of the difference amplifier in the processor, the output signal O may be related only to a peak signal, such as the blackest or the whitest signal, or to a peak signal and to an average signal A, which represents the average image detail of the entire picture element. For example, by selecting the gain $K_1$ of amplifier 25B to be unity, the output signal $O_B$ may be expressed as $$O_B=A+1(B-A)=A+B-A=B$$

Thus, $O_B$ is only a function of the peak black signal B. Similarly, when $K_2$ (FIGURE 4) is equal to 1

$$O_A=A+1(W-A)=A+W-A=W$$

On the other hand, when $K_1$ or $K_2$ is other than unity, the output signal O is a function of one of the peak signals (B or W) and the average signal A.

The ability to control the characteristics of the output signal or information bit, representing each scanned picture element, is most significant when fine detail contrast appearing in the original picture is to be preserved in the reproduced picture. For example, when fine thin black image detail is present in a large white background in the original picture, by processing the signals from each relatively large picture element to produce an output signal $O_B$, the fine black image details in the form of the blackest signal B contribute significantly to the output signal, out of proportion to their contribution to the average intensity of the picture element. Thus, the fine black image detail is significantly preserved in the output signal $O_B$ which is used for reproducing the original picture. The contribution of the fine black detail to the output signal $O_B$ may be controlled by controlling the gain of the difference amplifier so that the enhancement of the fine black detail may be controlled by an operator to produce any desired detail contrast or intensity, depending on the nature of the information in the picture and its ultimate use.

Similarly, when fine white image detail is present in a relatively dark or black background, by selecting the whitest signal W, and generating an output signal $O_W$, the fine white detail may be preserved, as well as enhanced, by selectively controlling the gain $K_2$ of difference amplifier 25W, so that the contribution of the fine white detail to the output signal $O_W$ may be selectively controlled. By generating a single information bit for each relatively large picture element which is scanned at any given time, the number of information bits necessary to reproduce a single picture is reduced, and thereby substantial bandwidth compression is achieved. In the foregoing example, by utilizing a matrix of 3 x 3 photocells, a bandwidth compression ratio of 9:1 is achieved.

Figure 5:
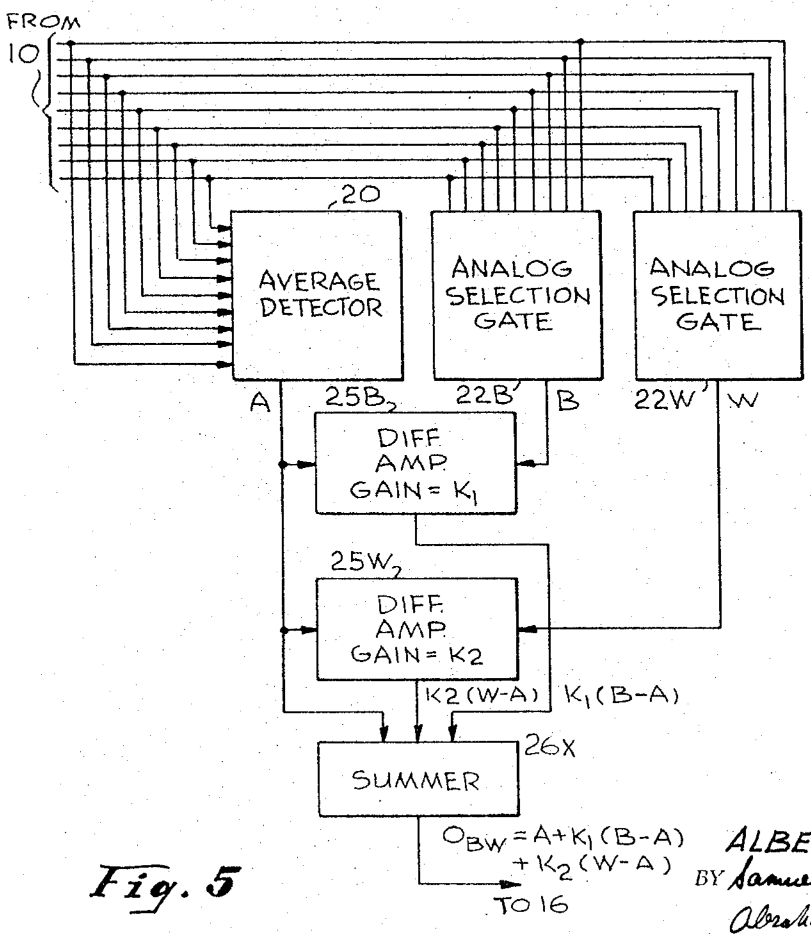
FIGURE 5 is an embodiment of a video signal processor utilizing peak black and while signals.

Depending on the intensity characteristics of the pictures to be processed, it may be desirable to produce, in response to the scanning of each relatively large picture element such as 12*e*, an output signal O which is a function of both the black and white peak signals. A processor providing such a signal is diagrammed in FIGURE 5 to which reference is made herein. Briefly, the arrangement shown in FIGURE 5 is a combination of the processors, diagrammed in FIGURES 3 and 4, except that in FIGURE 5, a summing circuit, or summer 26*x* is diagrammed, which sums up three signals, rather than the summer 26 shown in FIGURES 3 and 4 which responds only to two input signals. The output of the summer 26*x* designated $O_{BW}$ is a function of the average signal A from average detector 20, as well as the outputs of difference amplifiers 25B and 25W.

By controllably adjusting the gains $K_1$ and $K_2$ of amplifiers 25B and 25W respectively, the relative contributions of the average signal A representing the average intensity of the picture element, as well as the peak black and white signals (B and A) may be controlled. For example, with both K's equal to zero, the output signal $O_{BW}$ is equal to signal A, while the output is equal to the peak signal B when gain $K_1$ is equal to one and $K_2$ is equal to zero. On the other hand, the output signal is equal to the peak signal W when gain $K_1$ is equal to zero and $K_2$ is equal to one. With the gains equal to one-half the output signal $O_{BW}$ is equal to $$\frac{B+W}{2}$$

In the processors herebefore described, it is appreciated that peak signals representing the blackest or the whitest average intensity of any of the element portions are used to significantly influence the output signal or information bit, representative of an entire multiportion picture element. Such processors operate satisfactorily in a relatively noiseless environment. However, in a noisy environment, a danger exists that extraneous noise may affect any one of the photocells to provide a peak voltage which is not due to detected peak intensity of the element portion which the affected photocell senses but rather, as a result of noise. Thus, if any one of the photocells is affected by noise, the output signal representative of a complete picture element may be significantly distorted.

To decrease the system's sensitivity to noise, in another embodiment of the present invention, an analog selection gate, designated 22B$_S$ in FIGURE 6 to which reference is made herein is operated to select out of the nine signals supplied thereto, the signal with the second highest positive voltage representing the second blackest signal rather than the blackest signal. Similarly, an analog selection gate 22W$_S$ may be operated to select the second whitest signal of nine signals supplied thereto, rather than the whitest signal, as hereinbefore described. By selecting the second blackest and the second whitest signals to represent the peak signals B and W respectively, the likelihood that such signals are a result of noise is substantially reduced, since in order for noise to affect and produce such signals, two out of the nine photocells must be affected by noise pulses, a condition which does not occur as often as the presence of a single noise spike affecting a single of the nine photocells.

It is appreciated, that by selecting the second blackest or second whitest signal, some loss of intensity contrast results. However, this can largely be compensated by over-enhancing the output signal by increasing the gain of the related difference amplifier. Thus, for example, in order to compensate for the selection of the second blackest signal to represent the signal B supplied to difference amplifier 25B (FIGURES 3 and 5) gain $K_1$ may be increased. Similarly, to compensate for the selection of the second whitest signal to produce signal W, the gain $K_2$ (FIGURES 4 and 5) of amplifier 25W may be increased.

In implementing average detector 20, various circuit techniques may be employed to combine a plurality of analog signals and produce an analog output which represents the average of all the input signals. Similarly, various analog circuit techniques may be employed in implementing the analog selection gate 22B to produce the output signal B representing the blackest input signal, i.e., the signal with the largest positive voltage. One embodiment of gate 22B for selecting the blackest signal is diagrammed in FIGURE 7 to which reference is made herein. Briefly, gate 22B includes a plurality of diodes designated by numerals 32, with the cathodes of all of the diodes being connected at a junction point 33, to which one end of a resistor 35 is connected. The other terminal of resistor 35 is connected to a reference potential such as −10 volts. Junction point 33 represents the output terminal of gate 22B. The anodes of the various diodes 32 are connected to the various photocells P1 through P9 (FIGURE 2). As is appreciated by those familiar with the art, the voltage at junction point 33 will be substantially equal to the largest positive voltage of any of the nine input signals, thereby representing the blackest of the nine signals.

One embodiment of the analog selection gate 22W is diagrammed in FIGURE 8 to which reference is made herein. As seen therein, the embodiment of gate 22W is similar to that of gate 22B, but for the reverse polarities of diodes 32 and the opposite polarity of the reference potential to which the one terminal of resistor 35 is connected. In gate 22W, the voltage at junction point 33 corresponds to the largest negative voltage of the nine input signals, thereby representing the whitest input signal.

Reference is again made to FIGURE 6 which is a schematic diagram of one embodiment of the selection gate 22B$_S$, the function of which is to select the second blackest signal of nine signals supplied thereto, i.e. the signal with the second highest positive voltage. Basically, gate 22B$_S$ includes a matrix of diodes 40 arranged to form nine OR gates. Each OR gate is provided with a different group of eight input signals from the nine signals from photocells P1 through P9, to provide an output signal which corresponds to the blackest signal of the eight signals supplied thereto. For example, the signals from photocells P1 through P8 are coupled to diodes 40 arranged in the first column, the diodes having their cathodes connected by a common line 42 at a junction point 51 which is connected to a source of negative potential such as −10 volts through a resistor 45. From the foregoing, it should be appreciated that the voltage at junction point 51 is equal to the largest positive voltage, representing the blackest signal from any of photocells P1 through P8. Similarly, the voltage at each of junction points 52 through 59 connected through another resistor 45 to the −10 volts corresponds to the blackest signal of the eight input signals related thereto. Since each of the signals from each of the photocells is supplied to eight of the nine OR gates, it should be appreciated that the voltage at eight of the nine junction points will correspond to the blackest signal of the nine input signals from the photocells, while the remaining junction point will correspond to the second blackest signal. To extract the second blackest signal, each of the junction points is connected to a cathode of another diode 60, having their anodes connected to a junction point 62 to which one terminal of a resistor 64 is connected. The other terminal of resistor 64 is connected to a +10 volts supply. Thus, the voltage at junction point 62 corresponds to the lowest positive voltage at any of the nine junction points and thereby represents the second blackest signal of the nine signals from the nine photocells. Diodes 60 and resistor 64, together with junction point 62, in essence comprise an analog selection gate such as 22W, diagrammed in FIGURE 8. The function of the latter mentioned components is to detect the whitest signal at the nine junction points 51 through 59, since eight of the nine junction points contain the blackest signal, while the other junction point contains the less black or second blackest signal.

A similar arrangement may be employed in implementing a selection gate $\mathbf{22W_S}$ to provide a signal, representing the second whitest signal. In such implementation, the polarities of the various diodes shown in FIGURE 8 are reversed as well as the polarities of the reference potentials. Thus, in such an arrangement, the voltage at junction point 62, representing the output of the selection gate, will consist of the second whitest signal of the nine signals from the nine photocells. It should again be pointed out that generating the second blackest and second whitest signals is only advantageous in a noisy environment. However, if disruptive noise effects are not anticipated, the system may be satisfactorily operated by generating the blackest and whitest signals from each of the nine signals to produce the desired information bit per picture element as hereinbefore described.

In utilizing signals generated by any one of the foregoing described embodiments, it has been found that whenever the picture scanned includes coarse lines which compare with the size of the photocell aperture, undesirable loss of resolution of the lines occurs. This has been found to be due to the spilling over of image detail or intensity of a coarse line in one picture element to the photocells when an adjacent picture element is scanned. Thus, coarse lines may affect the output signals of adjacent picture elements and therefore result in broadening or loss of resolution of the lines. Referring again to FIGURE 2, therein the matrix of the photocells P1 through P9 is shown above a picture element $\mathbf{12}e_1$. Let us assume that picture element $\mathbf{12}e_4$, above element $\mathbf{12}e_1$, contains a relatively broad line near the border between the two picture elements. Then, it should be appreciated that some of the image detail or intensity of such a broad line, hereafter also referred to as tails, may spill over and affect any or all of photocells P1, P2, and P3, and thereby affect the information bit which is generated to represent the intensity of element $\mathbf{12}e_1$ only.

Figures 9, 10, 11:
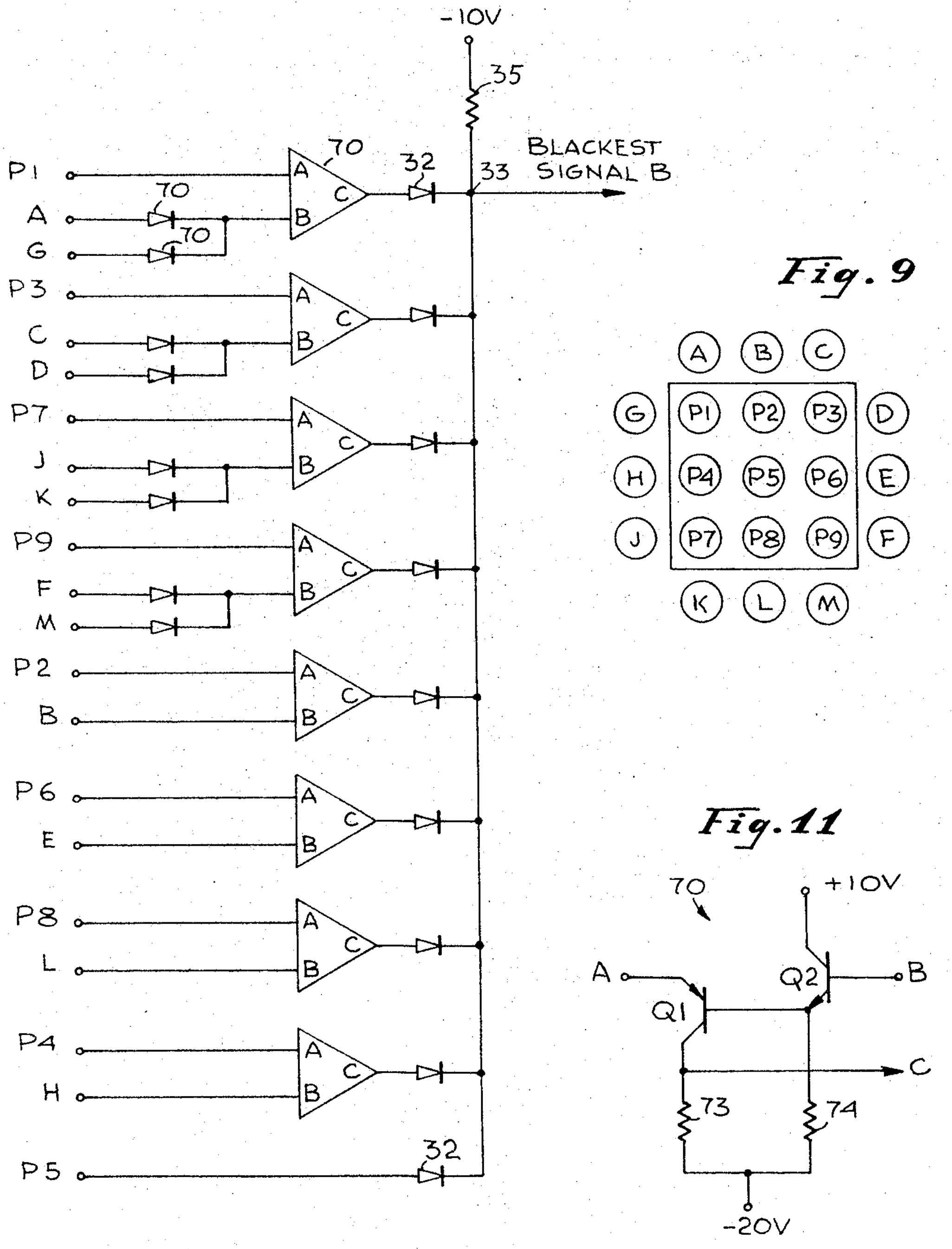
FIGURE 9 is a top view of a photocell matrix consisting of nine photocells and a plurality of external peripheral photocells.
FIGURE 10 is a diagram of a selection gate for providing a peripherally corrected black signal.
FIGURE 11 is a schematic diagram of a comparison circuit shown in FIGURE 10.

In order to overcome the effect of tails in adjacent elements from affecting the output signal processed to represent another picture element, such as $\mathbf{12}e_1$, the video scanning unit 10 (FIGURE 1) may include a plurality of photocells arranged about the periphery of the matrix of the nine photocells P1 through P9. Such an arrangement is shown in FIGURE 9, to which reference is made herein. Therein, the matrix of 3 *x* 3 photocells P1 through P9 is shown surrounded by photocells designated A through H and J through M.

Cells P1–P4 and P6–P9, positioned about the periphery of the matrix, may be though of as matrix peripheral cells, while cells A–H and J–M may be defined as external peripheral cells. Also since the size of the matrix defines the size of the element which is simultaneously scanned, the matrix hereafter will also be referred to as the scanning aperture. To eliminate the effect of tails, prior to utilizing the output of each matrix peripheral cell, the output of adjacent external peripheral cell or cells may be subtracted therefrom. For example, the output of each external peripheral cell, such as A and G, may be subtracted from the output of an adjacent matrix peripheral cell, such as P1, to provide a resultant output for each matrix peripheral cell. These resultant outputs, eight in the present example, and the direct output of internal cell P5, may then be logically combined to produce the blackest or the whitest signals, as hereinbefore described. Also, the resultant outputs together with the outputs of internal cells (such as P5) may be similarly used to generate the second blackest or the second whitest signals. By utilizing the subtraction technique, tails from broad dark lines in adjacent elements will be inhibited from affecting the output signal from becoming black. Thus, the broadening effect of dark lines will be eliminated.

In another embodiment of the present invention, the outputs of the external peripheral photocells (A through H and J and M), instead of being linearly subtracted from the outputs of their adjacent photocells within the scanning aperture, i.e. the matrix peripheral cells, are nonlinearly compared therewith to determine which output is the greater of the two. For example, the output of each of cells A and G is compared with the output of cell P1. If the output of P1 is blacker than the output of either of the other two cells, the P1 output is utilized in deriving the blackest signal of the particular scanned picture element. On the other hand, if the output of cells A or G is greater than the output of P1, i.e. the output of cell A or G is blacker than that of cell P1, the output of P1 is removed from further processing. This is done by causing the output from P1 to be driven to a level outside the black-white logic levels, hereinbefore assumed to be +10 volts to −10 volts, so that the output of cell P1 is completely overlooked in subsequent circuitry which is used to generate the blackest or the second blackest signal.

Similarly, the output of P2 is compared with the output of external peripheral cell B, with the output of P2 being utilized only when it is blacker than that of cell B. Such a technique may be thought of as peripheral cancellation wherein the outputs of all the matrix peripheral cells, within the scanning aperture or matrix, are compared with the outputs of their respective adjacent external peripheral cells. The peripheral cancellation is done for both black and white tails. In such a technique, only the outputs of the interior cells within the scanning aperture, such as photocell P5 and the outputs of the matrix peripheral cell within the scanning aperture which are greater than the outputs of adjacent exterior peripheral cells, are utilized to generate the blackest or second blackest and the whitest or second whitest signals as hereinbefore described.

Reference is now made to FIGURE 10 which is a block and schematic diagram for producing a peripherally corrected blackest signal. Therein, elements, identical to those previously described, are designated by like numerals. In FIGURE 10, the plurality of diodes 32, resistor 35, and a junction point 33 constitute the selection gate, such as gate 22B diagrammed in FIGURE 7. However, whereas in FIGURE 7 the anodes of diodes 32 are directly connected to the outputs of photocells P1 through P9, in the arrangement shown in FIGURE 10 each anode is connected to an output terminal C of another comparison circuit, generally designated by reference numeral 70. The inputs to the circuits 70 are supplied from the photocell array, represented in FIGURE 9. The output of each of the nine photocells P1 through P9 is connected to an A input of a different one of circuits 70, while a B input of the circuit is connected to one or more of the external peripheral photocells adjacent to the particular matrix peripheral cell. When the signal from one of the photocells within the matrix is to be compared with two signals, such as for example the output of P1 which is compared with the output of both cells A and G, the signals, from the latter mentioned cells, are supplied to the circuit 70 through diodes generally designated by numeral 71. Thus for example, the output of P1 is supplied to the A input of the first circuit 70 while the outputs of A and G are supplied to the B input through diodes 71.

As hereinbefore briefly stated, the function of circuit 70 is to compare the output of P1 with the larger of the two outputs supplied thereto from cells A and G. Only when the output of P1 is the larger or blacker than the signals from A or G does circuit 70 provide an output at output terminal C which corresponds to the input at terminal A. However, if the signal from the external peripheral cell such as A or G is greater or blacker than the signal from P1, circuit 70 provides an output signal outside of the black-white voltage range, thereby inhibiting a signal from being supplied through the diode connected to the output thereof to the junction point 33.

A simplified schematic diagram of circuit 70 is shown in FIGURE 11 to which reference is made herein. The circuit is shown comprising a PNP transistor Q1, having its emitter connected to the A input terminal. A collector is connected to a −20 volts source, through a resistor 73, while the base of Q1 is connected to an emitter of an NPN transistor Q2. The emitter of Q2 is also connected to the −20 volts source, through a resistor 74, while its collector is connected to a source of +10 volts and its base to the other input B of circuit 70. The voltage at the collector of Q1 represents the output at terminal C. Basically, transistor Q2 operates as an emitter follower, so that the input signals at inputs A and B may be thought of as being supplied to the emitter and base respectively, of transistor Q1.

If the signal from the particular matrix peripheral photocell is greater than the signal from the external peripheral cell with which it is compared, i.e. the signal at input terminal A is more positive than that at input terminal B, transistor Q1 will readily saturate, cutting off transistor Q2 so that the output at output terminal C will be identical with that at input terminal A representing the output of the particular photocell within the matrix. If however the signal from the external peripheral cell, such as cell A, is greater than that of the matrix photocell P1 with which it is compared, i.e. the input terminal B is more positive than the input terminal A, the emitter follower will cause transistor Q1 to cut off, driving the collector voltage thereof which also represents the voltage at the output terminal C, to −20 volts which is far below the level of the whitest signal to be encountered, since the whitest signal is assumed to be only −10 volts. Thus, that particular output signal will never appear in the output of the OR circuit, represented by the voltage at the junction point 33 (FIGURE 10) since the particular comparison circuit will be cut off from the junction point by the diode 32 interposed therebetween.

It should be appreciated that the arrangement shown in FIGURE 10 comprises a circuit for producing a peripherally corrected blackest signal. A peripherally corrected second blackest signal may be produced by supplying the outputs of the various comparing circuits 70 to the diodes 40, shown in FIGURE 6, which comprise the diode matrix of the selection gate 22$B_S$. Also, it should be appreciated that a similar arrangement may be employed to generate a peripherally corrected whitest signal or a peripherally corrected second whitest signal by a similar arrangement in which the pluralities of the various diodes and the reference potentials, as well as the polarities of the two transistors Q1 and Q2 may be reversed. That is, in a circuit for producing a peripherally corrected white signal, Q1 is an NPN transistor and Q2 is a PNP transistor.

Summarizing the foregoing description of the present invention, in accordance with the teachings thereof, means are provided for combining the outputs of the nine photocells forming the scanning aperture or matrix to provide any one or a combination of blackest signal B, representing the blackest average intensity of any one of the element portions of the scanned element, the second blackest signal, a peripherally corrected blackest signal, a peripherally corrected second blackest signal, as well as the whitest signal, the second whitest signal, a peripherally corrected whitest signal, and a peripherally corrected second whitest signal. Referring to all the signals related to black and white average intensities as selected black and white signals, in one embodiment of the invention, diagrammed in FIGURE 3, the selected black signal is utilized together with an average signal A, representing the average intensity of the outputs of all nine photocells, to produce an output signal $O_B$, which is a function of both the average signal and the selected black signal. On the other hand, in the embodiment diagrammed in FIGURE 4, it is the selected white signal W that is employed together with the average signal A to produce the output signal $O_W$ which is utilized to reproduce the image detail of the entire picture element.

Still, in other embodiment of the present invention, diagrammed in FIGURE 5, both selected signals B and W and the average signal A are utilized to produce the output signal $O_{BW}$. It should be pointed out that in the embodiment diagrammed in FIGURE 5, the selected black signal B is individually operated upon in conjunction with the average signal A to produce the signal $K_1(B-A)$. Similarly, the selected white W signal is independently operated upon in conjunction with the average signal A to produce the signal $K_2(W-A)$. These two signals, together with the average signal A, are then summed up in summer 26X to produce the output signal $O_{BW}$ which is a function of all three signals, i.e. average signal A, selected signal B, and selected signal W. In still another embodiment of the present invention, selected black and white signals are first generated. Thereafter, the average signal A is subtracted from each of the selected signals to produce signals $B-A$ and $W-A$. A determination is then made which is the larger of the two signals. If signal $B-A$ is larger, the B signal is utilized as the output signal. On the other hand, if the $W-A$ signal is larger, the W signal is utilized as the output signal. The larger of the two signals may be independently utilized as the output signal or be combined with the average signal A to produce an output signal $O_C=A+K(C-A)$. C represents the larger of the two signals, i.e. either B or W depending on the peak brightness characteristics of the picture element under the scanning aperture, and K is a controlled amplifier gain.

Figure 12:
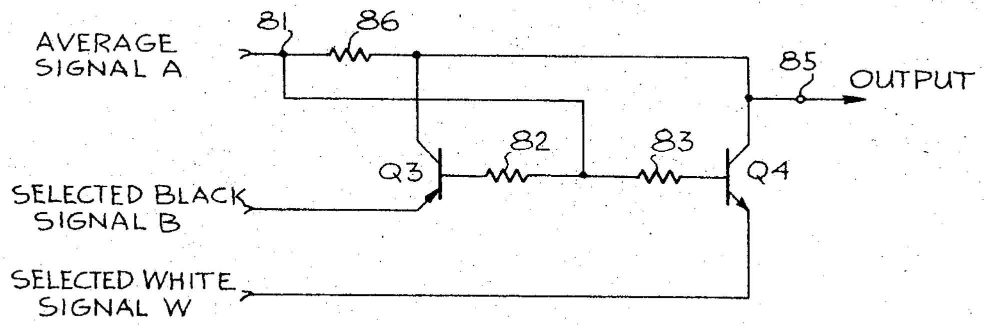
FIGURE 12 is a schematic diagram of a comparing circuit.

One embodiment of a comparing circuit for providing the correction signal C is diagrammed in FIGURE 12 to which reference is made herein. The comparing circuit, supplied with the average signal A, the selected black signal B, and the selected white signal W, includes a PNP transistor Q3 and an NPN transistor Q4. The selected black signal B is connected to the emitter of transistor Q3, while the selected white signal W is connected to the emitter of transistor Q4. The bases of Q3 and Q4 are connected to an input terminal 81, to which the average signal A is supplied, through equal resistors 82 and 83, respectively. The collectors of the two transistors are tied together to an output terminal 85 as well as to the input terminal 81 to which the average signal A is supplied, through a relatively large resistor 86.

In operation, if selected black signal B differs from the average signal A by somewhat more than the selected white signal W, transistor Q4 will draw somewhat more current and saturate. As a result, the common collector output signal at terminal 85 will be substantially identical to the selected black signal B at the emitter of Q3. By making the collector load relatively large, only a slight difference between the selected black signal B and the selected white signal W is required to force saturation to take place. If both signals B and W are identical, the output signal at terminal 85 will follow the average signal A. Thus, the signal at output terminal 85 follows either signal B or W depending which differs from the average signal A by a greater amount.

Figure 13:
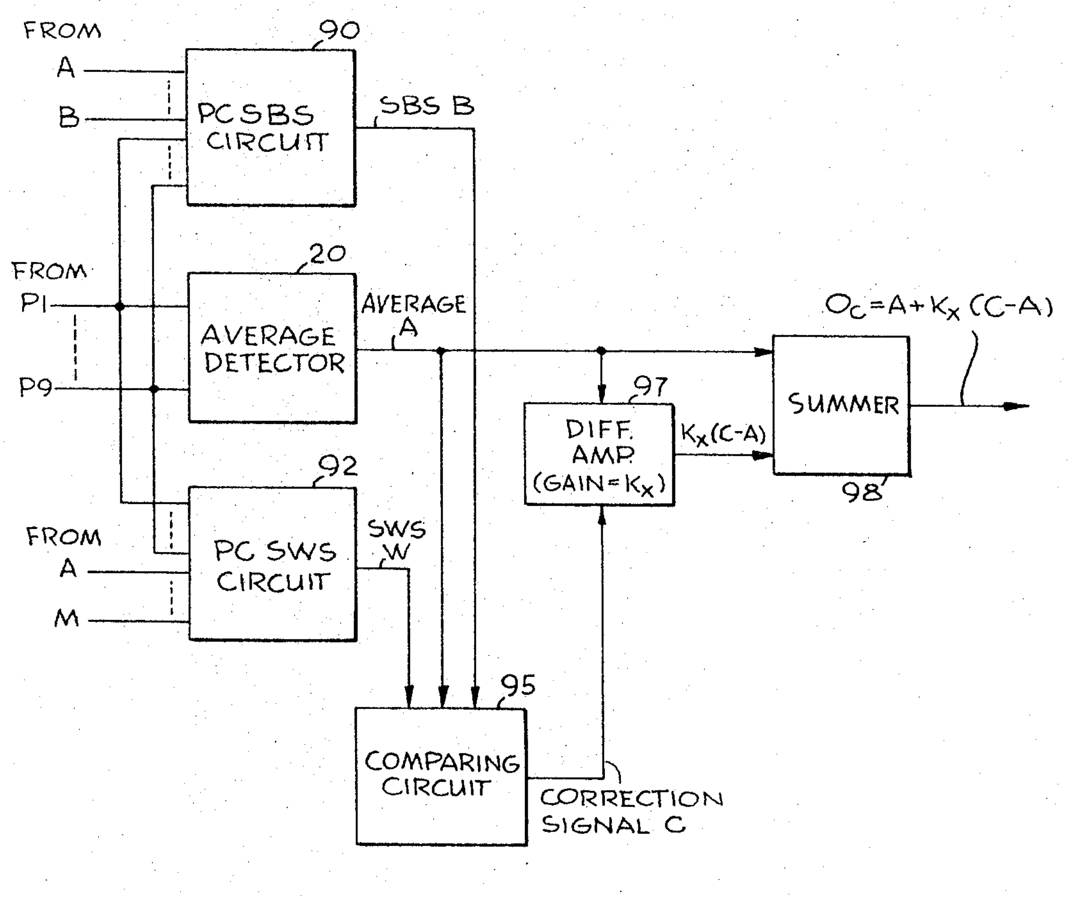
FIGURE 13 is a block diagram of a preferred video signal processor in accordance with the teachings of the present invention.

Reference is now made to FIGURE 13 which is a block diagram of the embodiment of the invention in which circuits producing peripherally corrected selected black and white signals, as well as the comparing circuit previously described in conjunction with FIGURE 12, are incorporated. Such an embodiment has been found to produce output signals or information bits which are highly useful in reproducing the originally scanned picture, while preserving most of the significant fine black and white details therein, even though a single information bit is produced for each relatively large element consisting of a plurality of element portions. In such an arrangement, the nine outputs of cells P1 through P9, forming the scanning apertures, are supplied to an average detector 20, similar to the detectors previously described in conjunction with FIGURES 3, 4, and 5. In addition, these outputs are supplied to a peripherally corrected selected black signal (PCSBS) circuit 90 which is similar to the circuit diagrammed in FIGURE 10, as well as to a peripherally corrected selected white signal (PCSWS) circuit 92.

Circuits 90 and 92 are also supplied with the outputs of the external peripheral cells (FIGURE 9) A through H and J through M, so that in each of the circuits the signals from the external peripheral cells are compared with the signals from the matrix peripheral cells or the cells within the scanning aperture, about the periphery thereof. The output of detector 20, consisting of an average signal A and the outputs of circuits 90 and 92 comprising the selected black signal B and the selected white signal W, respectively, are supplied to a comparing circuit 95, which is schematically diagrammed in FIGURE 12. The output of circuit 95 consists of a correction signal C which is either the selected black signal B or the selected white signal W, depending which differs from the average signal A by a greater amount. The average signal A and the correction signal C are supplied to a difference amplifier 97. The gain $K_X$ of amplifier 97 is adjustable. The output of amplifier 97 may be designated as $K_X(C-A)$. The output of amplifier 97, as well as the output of detector 20, are supplied to a summing circuit or summer 98, the output of which comprises the output signal $$O_C=A+K_X(C-A)$$

This output signal representing the information bit may then be supplied to transmitter 16 (FIGURE 1) to represent the intensity or brightness characteristic of the particular element that is scanned.

Heretofore, various arrangements have been described to generate a single information bit 0 to represent the intensity characteristics of a relatively large element which may be divided into a plurality of portions, with each portion providing an output signal related to the average intensity thereof. Thus, by providing a single information bit to represent a relatively large picture element, the number of bits required to reproduce the picture is therefore reduced, resulting in a substantial bandwidth compression. The various arrangements actually employed to generate the information bit depend on the particular image details or intensity characteristics of the picture and the particular use of reproduced picture. The particular arrangement diagrammed in FIGURE 13 has been found to be quite useful in preserving relatively fine black details on large white backgrounds, as well as fine white details present in picture elements, comprising essentially of a relatively black background. However, it is appreciated that any other of the embodiments and/or different combinations thereof may be employed, depending on the processed picture and the ultimate use of its reproduction.

There has accordingly been shown and described herein different embodiments of a system for processing data or signals provided in response to scanning a picture to detect the intensity characteristics thereof. These processed signals result in a reduced number of information bits needed to reproduce the original picture, with most of the significant fine picture details preserved. It is appreciated that those familiar with the art may make modifications and/or substitute equivalents in the arrangements as shown. Therefore, all such modifications, and all equivalents, are deemed to fall within the scope of the invention as claimed in the appended claims.

What is claimed is:

1. A system for processing a picture, consisting of a plurality of picture elements, to provide output signals representing the intensity characteristics of the picture elements, comprising:

first means for converting the intensity characteristics of each picture element into a plurality of signals, each signal being a function of the average intensity of a different portion of said picture element;

second means responsive to said plurality of signals for providing an average signal representing the average intensity of said picture element;

third means responsive to said plurality of signals for providing a first selected signal representing the average intensity of one element portion, the average intensity of said one element portion having a first preselected relationship to the average intensities of the other portions of said element; and output means responsive to said average signal and said first selected signal for providing an output signal which is a function of said average signal and said first selected output signal.

2. The system defined in claim 1 wherein the average intensity of said one element portion is the blackest average intensity of any of said element portions.

3. The system defined in claim 1 wherein the average intensity of said one element portion is the second blackest average intensity of any of said element portions.

4. The system defined in claim 1 wherein the average intensity of said one element portion is the whitest average intensity of any of said element portions.

5. The system defined in claim 1 wherein the average intensity of said one element portion is the second whitest average intensity of any of said element portions.

6. The system defined in claim 1 further including fourth means responsive to said plurality of signals for providing a second selected signal representing an average intensity of one of said element portions which has a second preselected relationship to the average intensities of the other element portions;

said output means providing said output signal in response to said first selected signal, said second selected signal and said average signal, said output means including means for adjusting the effect of each of said first selected signal, second selected signal and average signal on the output signal.

7. The system defined in claim 6 wherein said first selected signal represents the blackest average intensity of any portion of said element and said second selected signal represents the whitest average intensity of any portion of said element.

8. The system defined in claim 6 wherein said first selected signal represents the second blackest average intensity of any portion of said element and said second selected signal represents the second whitest average intensity of any portion of said element.

9. A system for processing a picture consisting of a plurality of picture elements to provide an output signal in response to the intensity characteristics of each picture element comprising:

first means for scanning each picture element, each element including a plurality of portions, said first means including a first plurality of sensors arranged in a selected matrix, each sensor providing a signal representing the average intensity of a different portion of said picture element, said first means further including a second plurality of external sensors arranged about the periphery of said matrix, each external sensor providing a signal representing the average intensity of an element portion in an element adjacent said picture element being scanned, each sensor within said matrix about the periphery thereof defining a matrix periphery sensor and being associated with at least one external sensor;

second means responsive to the signals from said first plurality of sensors for providing an average signal representing the average intensity of said picture element being scanned;

third means responsive to the signals of said first plurality of sensors and said second plurality of external sensors for providing at least a first peripherally corrected selected signal, said third means including a plurality of comparing means, each comparing means including means for comparing the signal from a matrix peripheral sensor with the signal from an external sensor associated therewith to provide an output signal representing the signal of the matrix peripheral sensor supplied thereto, only when the signal from said matrix peripheral sensor exceeds the signal from the external sensor associated therewith, said third means further including selecting means responsive to the output signals of said comparing means and the signals from sensors in said matrix other than matrix peripheral sensors to provide said at least first peripherally corrected selected signal; and output means responsive to said average signal and at least said first peripherally corrected selected signal for providing the output signal representing the intensity characteristics of the picture element being scanned.

10. The system defined in claim 9 wherein said at least first peripherally corrected selected signal represents the blackest average intensity of any of the portions of said element which are not affected by the average intensities of element portions in adjacent elements.

11. The system defined in claim 9 wherein said at least first peripherally corrected selected signal represents the whitest average intensity of any of the portions of said element which are not affected by the average intensities of portions in adjacent elements.

12. The system defined in claim 9 wherein said at least first peripherally corrected selected signal represents the second blackest average intensity of any of the portions of said element which are not affected by the average intensities of portions in adjacent elements.

13. The system defined in claim 9 wherein said at least first peripherally corrected selected signal represents the second whitest average intensity of any of the portions of said element which are not affected by the average intensities of portions in adjacent elements.

14. The system defined in claim 9 wherein said third means include means for providing a second peripherally corrected selected signal, said first peripherally corrected selected signal representing the blackest average intensity of any of the portions of said element which are not affected by the average intensities of portions in adjacent elements and said second peripherally corrected selected signal represents the whitest average intensity of any of the portions of said element which are not affected by the white average intensities of portions in adjacent elements, said output means further including means for providing said output signal as a function of said first peripherally corrected selected signal, said second peripherally corrected selected signal and said average signal.

15. The system defined in claim 14 further including means for comparing said first and second peripherally corrected selected signals to provide a signal representing the larger of the two selected signals, said output means including means for providing said output signal as a function of said average signal and the signal from said means for comparing, representing the larger of the two selected signals.

References Cited

UNITED STATES PATENTS 2,629,011 2/1953 Graham ------------ 178—6.8

RALPH D. BLAKESLEE, Primary Examiner

RICHARD K. ECKERT, Jr., Assistant Examiner

U.S. Cl. X.R.

178—6